's Patent Office
3,410,841
Patented Nov. 12, 1968

3,410,841
5,6,7,8-TETRA-HYDRO-2-NAPHTHOLAZO-BENZANILIDE DYESTUFFS
William H. Armento, Albany, and Lester N. Stanley, Delmar, N.Y., and William G. Huey, East Orange, N.J., assignors to GAF Corporation, a corporation of Delaware
No Drawing. Filed Oct. 28, 1965, Ser. No. 505,468
10 Claims. (Cl. 260—192)

ABSTRACT OF THE DISCLOSURE

A composition of matter particularly adapted for the dyeing of synthetic plastics comprising a dyestuff of the formula:

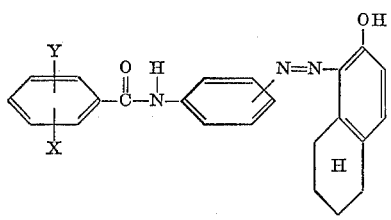

wherein X and Y are substituents selected from the group consisting of hydrogen, chlorine, hydroxy, lower alkyl and lower alkoxy.

---

This invention relates to a class of novel dyes, to processes for manufacturing and using the same and to products so produced and relates more particularly to new diazo-dyestuffs for use in the coloring of articles, particularly filamentary textile articles at least partially composed of polyester fibers.

It is well known in the dyeing art that polyester condensation products are among the most difficult synthetic plastic materials to color effectively, particularly textile materials including polyethylene terephthalate fibers and the like or blends of the same. It is to be understood that although the present invention is useful in dyeing polyester articles in general, polyester textile materials are commercially usually formed of polyethylene terephthalate, that is, the poly-condensation products of di-acids with di-alcohols, specifically, terephthalic acid with ethylene glycol. Such materials are available on the market under the tradenames "Dacron," "Tergal," and "Terylene" among others.

Further, in addition to all polyester textile materials, the dyestuffs of this instant invention are particularly valuable for use with mixed polyester-cottons and similar blends.

One commercial procedure for use in the coloring of polyester materials is the "Thermosol" technique described in detail in the *American Dyestuff Report, 42*, pages 1 and 2 (1953). According to this procedure the dyestuff is dispersed as a paste which is padded onto the material being dyed, the article being subjected to both elevated temperature and relatively high pressure, and the excess paste then being removed. Basically, the "Thermosol" technique comprises contacting the material to be colored with the dyestuff dispersion at a temperature from about 140 to 180° F., drying the same and then subjecting the dried material to a temperature of from about 390 to 440° F. for approximately ½ to 2 minutes.

The increased use of polyester fibers in recent years has led to a demand for improving dyeing of the same. The use of dyestuffs previously found suitable for other synthetic materials has not resulted in a satisfactory coloring of the polyesters. Prior art dyestuffs suffer from a lack of wash fastness and dry cleaning fastness and are not sufficiently resistant to fading and sublimation. Additionally, many of the newer dyestuffs which have evolved for use with polyester fibers still suffer from poor light fastness and those which have been able to improve on the light fastness are usually subject to the drawback of insufficient resistance to sublimation at high temperatures. The problem is of particular importance since it prevents the use of high temperature dyeing processes such as the "Thermosol" technique described hereinabove.

Furthermore, the less bathochromic yellow and orange dyes tend to sublime more on high temperature treatment than other dyes. Thus, it becomes increasingly important to find dyes of this type which will color polyester fibers in bright shades of good light and sublimation fastness.

While the dyestuffs of this invention are particularly useful for the more difficult to dye polyester condensation products, it is to be understood that they are also of value for use as disperse dyes for other synthetic plastic materials such as cellulose acetate, cellulose triacetate polyamides, polyvinyl, polyacrylic and polyurethane films and fibers and the like.

It is therefore a primary object of this invention to provide dyestuff compositions and procedures particularly adapted for manufacturing and use for the same, which are free from the foregoing, and other disadvantages.

Another important object of this invention is the provision of a dyestuff which will produce a strong, bright orange coloration of good build-up having desirable fastness to washing, dry cleaning, light and sublimation.

A further object of the instant invention is the provision of a diazo-dyestuff which is relatively simple and inexpensive to manufacture utilizing well known prior techniques.

Yet a further object of the invention is the provision of a dyestuff composition which may be utilized in a relatively simple manner to color articles composed, at least in part, of synthetic plastic materials with a minimum of fading of the product after extended subjection to light or elevated temperatures.

A still further object of the instant invention is the provision of procedures for dying polyester condensation products with a color which is strong and fast.

Other and further objects reside in the specific characteristics of the dyestuff compositions and the manipulative steps of the procedures for manufacturing and using the same.

Still other objects will in part be obvious and in part be pointed out as the description of the invention proceeds.

Consistent with the above objectives, a dyestuff composition in accordance with the instant invention is comprised of a diazotized amino-benzanilide of the general formula:

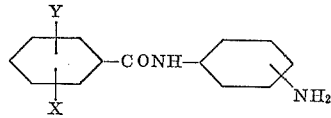

wherein X and Y are substituents selected from the group consisting of hydrogen, halogen such as chlorine, bromine and fluorine, hydroxy, especially the case where X is ortho to the carboxyl group and Y is hydrogen, lower alkyl such as methyl, lower alkoxy, such as methoxy, ethoxy, and propoxy, coupled with 5,6,7,8-tetrahydro-2-naphthol.

The dyestuffs of the present invention accordingly comprise dyestuffs of the formula:

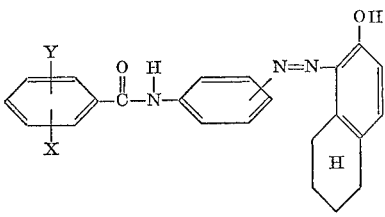

wherein X and Y are as defined above.

Suitable examples of the diazo bases are the following, which are to be considered merely as illustrative and not in a limiting sense:

2'-aminobenzanilide,
3'-aminobenzanilide,
4'-aminobenzanilide,
4'-amino-3-chlorobenzanilide,
4'-amino-p-toluanilide.
4'-amino-p-anisanilide,
4'-amino-3,4-dichlorobenzanilide,
4'-amino-2,4-dichlorobenzanilide,
4'-amino-2-hydroxybenzanilide, and the like.

In carrying out the process of the instant invention, one mole of an aminobenzanilide of the type described above is mixed well with hydrochloric acid, iced to 0–10° C., and then diazotized in the usual manner by treating with nitrous acid in the form generally of sodium or potassium nitrite. The diazo solution is reacted with an alkaline aqueous solution containing approximately one mole of 5,6,7,8-tetrahydro-2-naphthol as a coupler, the solution being made alkaline by addition of sodium hydroxide. If desired, somewhat larger or smaller quantities of coupler than a 1 to 1 molar ratio may be used, up to 10 percent in excess of the coupler. The diazo solution is run into the coupler solution while maintaining the temperature of the reaction below about 20° C. and while maintaining the pH of the reaction at from about 8.5 to 9. The thus-formed dyestuff is filtered and washed, and preferably dispersed by intimately mixing the wet dye with the desired amount of a suitable dispersing agent such as Polyfon H (sodium ligninsulfonate), Leonil SA (anionic naphthalenesulfonate) and the like.

In order to better understand the instant inventive concept, the following examples are set forth, it being understood that these examples are merely to be considered as illustrative and not limiting the scope of the invention.

Example 1

Approximately 21.2 g. of 4'-aminobenzanilide is mixed with 500 cc. of water and 25 cc. of hydrochloric acid 20° Bé., the mixture being heated to 95° C., and then cooled. To this solution at about 0–5° C. 22 cc. of 31.5 percent solution of sodium nitrite is added. Before coupling, excess nitrite is removed by treatment with sulfamic acid in the usual manner.

Approximately 14.8 g. of 5,6,7,8,-tetrahydro-2-naphthol is dissolved in 400 cc. of water containing 4 g. of sodium hydroxide plus 5 g. of soda ash to render the same alkaline. The diazo solution formed as described in the first paragraph of this example is run into this coupling solution while maintaining a pH of 8.5–9 by addition of soda ash as needed and care being exercised to maintain the temperature below 20° C. After coupling has taken place, the dye paste is filtered and washed several times with water.

Approximately 22 g. of the thus-formed dyestuff, is mixed with 20 g. of Polyfon H (sodium ligninsulfonate) and 4 cc. of Nekal WS–25 (sodium alkylnaphthalenesulfonate, GAF) the combination of ingredients being wetted down in a mixer with water to give a thick doughy mass. The water is evaporated to viscous milling viscosity, and the material is viscous milled for 1½ hours, water being added as needed. The product is then dried to a powder.

About 2 ounces of the so-treated dyestuff is dispersed in 83 cc. of warm water and poured into a solution containing 0.2 g. of Keltex gum (an alginic thickening agent) and 1 cc. of Nekal NF (sodium alkyl naphthalenesulfonate, GAF). This solution is made up to a gallon with water.

Dacron polyester material is padded with the above at 160° F., dried and cured at 425° F. for 90 seconds. The material is soaped at the boil for 5 minutes, washed and dried. A bright orange shade is obtained of good light fastness and excellent sublimation properties.

Example 2

Example 1 is repeated with the exception that the 4'-aminobenzanilide is replaced by 22.6 g. of 4'-amino-p-toluanilide. A somewhat redder orange is obtained having good light fastness and good sublimation properties.

Examples 3–9

Example 1 is again repeated substituting equivalent quantities of the following materials for the 4'-aminobenzanilide:

| Example: | Aminobenzanilide |
|---|---|
| 3 | 2'-aminobenzanilide. |
| 4 | 3'-aminobenzanilide. |
| 5 | 4'-amino-3-chlorobenzanilide. |
| 6 | 4'-amino-p-anisanilide. |
| 7 | 4'-amino-3,4-dichlorobenzanilide. |
| 8 | 4'-amino-2,4-dichlorobenzanilide. |
| 9 | 4'-amino-2-hydroxybenzanilide. |

Various shades of orange are obtained with the above materials all having good wash, dry cleaning, light and sublimation properties.

It will now be seen that there are herein provided improved dyestuff compositions, procedures for the manufacture and use, and improved products produced thereby, particularly orange colored polyester filamentary materials, which satisfy all of the objectives of the instant invention, and others, including many advantages of great practical utility and commercial importance.

Since many embodiments may be made of the instant inventive concept, and since many modifications may be made of the embodiments hereinbefore described, it is to be understood that all matter herein is to be interpreted merely as illustrative and not in a limiting sense.

What is claimed is:

1. A dye of the formula:

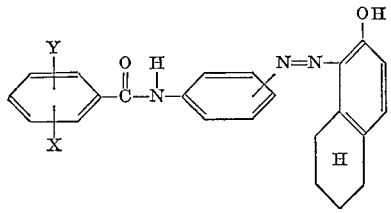

wherein X and Y are substituents selected from the group consisting of hydrogen, chlorine, hydroxy, lower alkyl and lower alkoxy.

2. The dye of claim 1 wherein said dye corresponds to the formula:

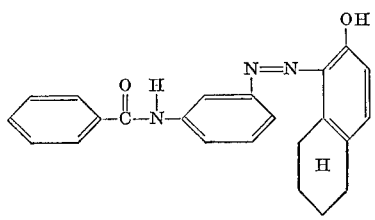

3. The dye of claim 1 wherein said dye corresponds to the formula:

[structure: benzamide-NH-phenyl-N=N-(2-hydroxy-tetrahydronaphthalene), with amide in ortho position]

4. The dye of claim 1 wherein said dye corresponds to the formula:

[structure: benzamide-NH-phenyl(para)-N=N-(2-hydroxy-tetrahydronaphthalene)]

5. The dye of claim 1 wherein said dye corresponds to the formula:

[structure: (Cl)benzamide-NH-phenyl(para)-N=N-(2-hydroxy-tetrahydronaphthalene)]

6. The dye of claim 1 wherein said dye corresponds to the formula:

[structure: H₃C-benzamide-NH-phenyl(para)-N=N-(2-hydroxy-tetrahydronaphthalene)]

7. The dye of claim 1 wherein said dye corresponds to the formula:

[structure: H₃CO-benzamide-NH-phenyl(para)-N=N-(2-hydroxy-tetrahydronaphthalene)]

8. The dye of claim 1 wherein said dye corresponds to the formula:

[structure: 3,4-dichlorobenzamide-NH-phenyl(para)-N=N-(2-hydroxy-tetrahydronaphthalene)]

9. The dye of claim 1 wherein said dye corresponds to the formula:

[structure: 2,4-dichlorobenzamide-NH-phenyl(para)-N=N-(2-hydroxy-tetrahydronaphthalene)]

10. The dye of claim 1 wherein said dye corresponds to the formula:

[structure: 2-hydroxybenzamide-NH-phenyl(para)-N=N-(2-hydroxy-tetrahydronaphthalene)]

References Cited
UNITED STATES PATENTS

| | | | |
|---|---|---|---|
| 2,864,816 | 12/1958 | Nicolaus et al. | 260—207 |
| 3,071,571 | 1/1963 | Gross et al. | 260—202 XR |
| 3,142,669 | 7/1964 | Feeman | 260—158 XR |
| 3,287,349 | 11/1966 | Gaetani et al. | 260—202 |

FOREIGN PATENTS 590,375   12/1933   Germany.

FLOYD D. HIGEL, Primary Examiner.